United States Patent [19]

Ueki et al.

[11] Patent Number: 4,911,036
[45] Date of Patent: Mar. 27, 1990

[54] PRESSURE REGULATING ARRANGEMENT FOR AUTOMATIC TRANSMISSION

[75] Inventors: Akihiro Ueki, Zama; Kazuhiko Sugano, Yokohama, both of Japan

[73] Assignee: Nissan Motor Co., Ltd., Yokohama, Japan

[21] Appl. No.: 264,736

[22] Filed: Oct. 31, 1988

[30] Foreign Application Priority Data

Oct. 30, 1987 [JP] Japan .................. 62-273232

[51] Int. Cl.$^4$ ............................................. B60K 41/10
[52] U.S. Cl. .......................................... 74/868; 74/869
[58] Field of Search .......................... 74/867, 868, 869

[56] References Cited
U.S. PATENT DOCUMENTS

| | | | |
|---|---|---|---|
| 3,719,108 | 3/1973 | Sakai .................. | 74/869 |
| 3,822,611 | 7/1974 | Piret .................. | 74/869 X |
| 4,200,008 | 4/1980 | Dach .................. | 74/869 |
| 4,843,917 | 7/1989 | Van Selons et al. ...... | 74/868 |

FOREIGN PATENT DOCUMENTS 4640122 12/1967 Japan .................. 74/869

OTHER PUBLICATIONS

Service Manual, Saab 9000, 4:2 Supplement Automatic Transmission, pp. 3, 17 and 18.

*Primary Examiner*—Leslie A. Braun
*Assistant Examiner*—Harold F. Macris
*Attorney, Agent, or Firm*—Foley & Lardner, Schwartz, Jeffery, Schwaab, Mack, Blumenthal & Evans

[57] ABSTRACT

A pressure regulating valve has a bore in which in a spool and an accumulator piston are disposed. A spring is disposed between the two elements and arranged to bias the spool in a first axial direction which tends to maximize the amount of hydraulic fluid which is supplied to a friction element. As the accumulator chamber defined by the accumulator piston fills, the spring is compressed increasing the bias on the spool.

The spool defines a feedback chamber, the pressure in which which tends to bias the spool in a second axial direction which minimizes the supply of hydraulic fluid, and which features a chamber which is supplied directly with a pressure indicative of transmission torque. This chamber is arranged so that the pressure therein produces a bias which also acts in the first axial direction and so that no resistance to the stroking of the accumulator piston is produced.

8 Claims, 4 Drawing Sheets

FIG. 4

| | | R/C | H/C | F/C | O/C | B/B 2A | B/B 3R | B/B 4A | L&R/B | F/O | L/O | GEAR RATIO | α1 = 0.45, α2 = 0.45 |
|---|---|---|---|---|---|---|---|---|---|---|---|---|---|
| D RANGE | ENGINE DRIVING 1ST | | | ○ | | | | | | ○ | ○ | $\frac{1+\alpha_1}{\alpha_1}$ | 3.22 |
| | ENGINE DRIVING 2ND | | ○ | ○ | | ○ | | | | ○ | | $\frac{\alpha_1+\alpha_2+\alpha_1\alpha_2}{\alpha_1(1+\alpha_2)}$ | 1.69 |
| | ENGINE DRIVING 3RD | | ○ | ○ | ○ | | | | | ○ | | 1 | 1 |
| | ENGINE DRIVING 4TH | | | (○) | ○ | | ○ | ○ | | | | $\frac{1}{1+\alpha_2}$ | 0.69 |
| | ENGINE BRAKING 1ST | | | (○) | ○ | ○ | ○ | | | | | | |
| | ENGINE BRAKING 2ND | | ○ | (○) | ○ | ○ | | | | | | | |
| | ENGINE BRAKING 3RD | | ○ | (○) | ○ | | ○ | | | | | | |
| | ENGINE BRAKING 4TH | | | (○) | | | ○ | ○ | | | | | |
| 2 ND RANGE | 1ST | | | ○ | | | | | | ○ | ○ | | |
| | 2ND | | | ○ | | ○ | | | | ○ | | | |
| 1 ST RANGE | 1ST | | | ○ | | | | | ○ | ○ | | | |
| REVERSE | 1ST | ○ | | | | | | | ○ | | | $-\frac{1}{\alpha_2}$ | -2.22 |

( ) UNRELATED TO POWER TRANSMISSION

PRESSURE REGULATING ARRANGEMENT FOR AUTOMATIC TRANSMISSION

BACKGROUND OF THE INVENTION

1. Field of the Invention

The present invention relates generally to a hydraulic control system for an automatic transmission for use in automotive vehicles and more specifically to a pressure regulation arrangement which controls the pressure supplied to selected a friction element or elements of the transmission.

2. Description of the Prior Art

The Saab 9000 Service Manual published in 1986, discloses a so called ZF4HP18 type transmission produced by the Swedish Saab-Scania Company describes a transmission which includes a spool and spring biased accumulator piston type pressure control arrangement wherein the spool is used to as a pressure regulator valve. The spool regulates or modifies the pressure in accordance with the bias applied from the spring which is disposed between it and the accumulator piston. As the piston strokes toward the spool the force applied by the spring increases. Accordingly, as the amount of stroke increases the bias produced by the spring increases and induces an increase in the level of the modified pressure. This pressure is supplied to a predetermined friction element of the transmission and, due to the increasing level of the same, induces smooth engagement.

The pressure which is used to control the movement of the spool is produced by a valve (referred to hereinunder as a throttle pressure modifier valve) which is modulates line pressure in accordance with the level of the throttle pressure (viz., a pressure indicative of the torque being applied to the engine transmission). The pressure discharged by this valve is supplied into a chamber of the pressure regulator valve defined between the spool and the accumulator piston.

In brief, with this arrangement as the level of the torque indicative pressure increases, the level of the regulated pressure discharged by the regulator valve is in turn increased. Accordingly, when the level of the torque indicative pressure (throttle pressure) increases in accordance with the operation of the engine, the level of the modified throttle pressure also increases. As a result, the level of the adjusted or regulated pressure also increases and the amount of torque which can be transmitted by the friction elements is increased.

However, with this system it is necessary to provide a special valve (viz., the throttle pressure re-adjusting or modifier valve) between the source of torque indicative pressure (throttle pressure) and the regulator valve in order to adjust the level of the throttle pressure before it is applied to said pressure regulator valve. That is to say, in the event that the throttle pressure modifier valve is not provided and throttle pressure is supplied directly between the spool and the accumulator piston of the regulator valve, the hydraulic fluid which is discharged from the regulator valve chamber defined between the spool and the accumulator piston, enters the throttle pressure circuit and even though the operation of the regulator valve is not effected, the amount of hydraulic fluid which must be drained by way of the throttle valve becomes excessive and causes a brief increase in the throttle pressure level. As the throttle pressure is supplied to shift valves of the transmission, this momentary boost in the level thereof increases the bias with which the spools of the shift valves are urged toward their respective downshift positions and possibility of an undesired downshift is brought in existence. In addition, this momentary fluctuation in the throttle pressure tends to induce the transmission shift point to undergo a sympathetic fluctuation and hunting of the transmission between gear ratios is rendered possible. For this reason it has been hitherto been necessary to provide the throttle pressure modifier valve. However, even when such a valve is provided, while the above mentioned undesirable effect on the throttle pressure is prevented, the amount of hydraulic fluid which can be drained by the throttle pressure modifier valve tends to be inadequate and the regulated pressure tends to be increased as a result.

SUMMARY OF THE INVENTION

It is an object of the present invention to provide a pressure regulating arrangement for controlling the pressure build-up characteristics of the hydraulic fluid which is supplied to a friction element or elements of the transmission, which is responsive to the level of the transmission torque load, and which does not adversely influence the transmission shifting characteristics.

In brief, the above object is achieved by an arrangement which includes a pressure regulating valve in which includes a bore in which in a spool and an accumulator piston are disposed. A spring is disposed between the two elements and arranged to bias the spool in a first axial direction which tends to maximize the amount of hydraulic fluid which is supplied to a friction element. As the accumulator chamber defined by the accumulator piston fills, the spring is compressed increasing the bias on the spool.

The spool defines a feedback chamber, the pressure in which which tends to bias the spool in a second axial direction which minimizes the supply of hydraulic fluid, and which features a chamber which is supplied directly with a pressure indicative of transmission torque. This chamber is arranged so that the pressure therein produces a bias which also acts in the first axial direction and so that no resistance to the stroking of the accumulator piston is produced.

More specifically, a first aspect of the present invention is deemed to comprise: a pressure regulating valve for a transmission having a shift valve and a friction element arranged to be supplied with hydraulic fluid from the shift valve, the pressure regulating valve featuring: a bore; a spool; an accumulator piston; a spring disposed between the spool and the piston, the spring being arranged to bias the spool in a first axial direction which tends to maximize the amount of hydraulic fluid which is supplied to a friction element; the accumulator piston defining an accumulator chamber, the chamber being arranged so that as it fills the spring is compressed increasing the force applied thereby, the spool defining a first feedback chamber in the bore, the first chamber being arranged so that as the pressure therein produces a bias which tends to which tends to bias the spool in a second direction which minimizes the supply of hydraulic fluid, and means defining a second chamber which is supplied directly with a pressure indicative of transmission torque, the second chamber being arranged so that the pressure therein produces a bias which acts in the first axial direction and which produces no resistance to the stroking of the accumulator piston A second aspect of the present invention is deemed to comprise a transmission which includes: a friction element; a source of hydraulic fluid; a source of pressure indicative of the torque being applied to the transmission; a pressure regulating valve fluidly interposed between the source and the friction element, the pressure regulating valve featuring: a bore, a spool reciprocatively disposed in the bore, the spool including; first and second lands which define a chamber in the bore which chamber is fluidly communicated with the torque indicative pressure source, the first and second lands defining a pressure responsive area which produces a bias which tends to move the spool in a first axial direction, and means defining a feedback chamber in the bore, the feedback chamber being communicated with the friction element in a manner wherein the pressure prevailing therein produces a bias which tends to move the spool in a second axial direction; an accumulator piston, the accumulator piston being reciprocately disposed in the bore in a manner to define an accumulator chamber which fluidly communicates with the friction element, the pressure prevailing in the accumulator chamber producing a bias which tends to move the accumulator piston in the first axial direction; and a compression spring disposed between the accumulator piston and the spool, the spring being arranged so that the force produced thereby increases as the accumulator chamber fills with hydraulic fluid and displaces the accumulator piston against the bias of the spring.

BRIEF DESCRIPTION OF THE DRAWINGS

FIG. 4 is a table showing the relationship between the engagement of the friction elements shown in FIG. 3 and the gear ratios produced by the transmission shown in FIG. 2.

DETAILED DESCRIPTION OF THE PREFERRED EMBODIMENTS

Figure 2:
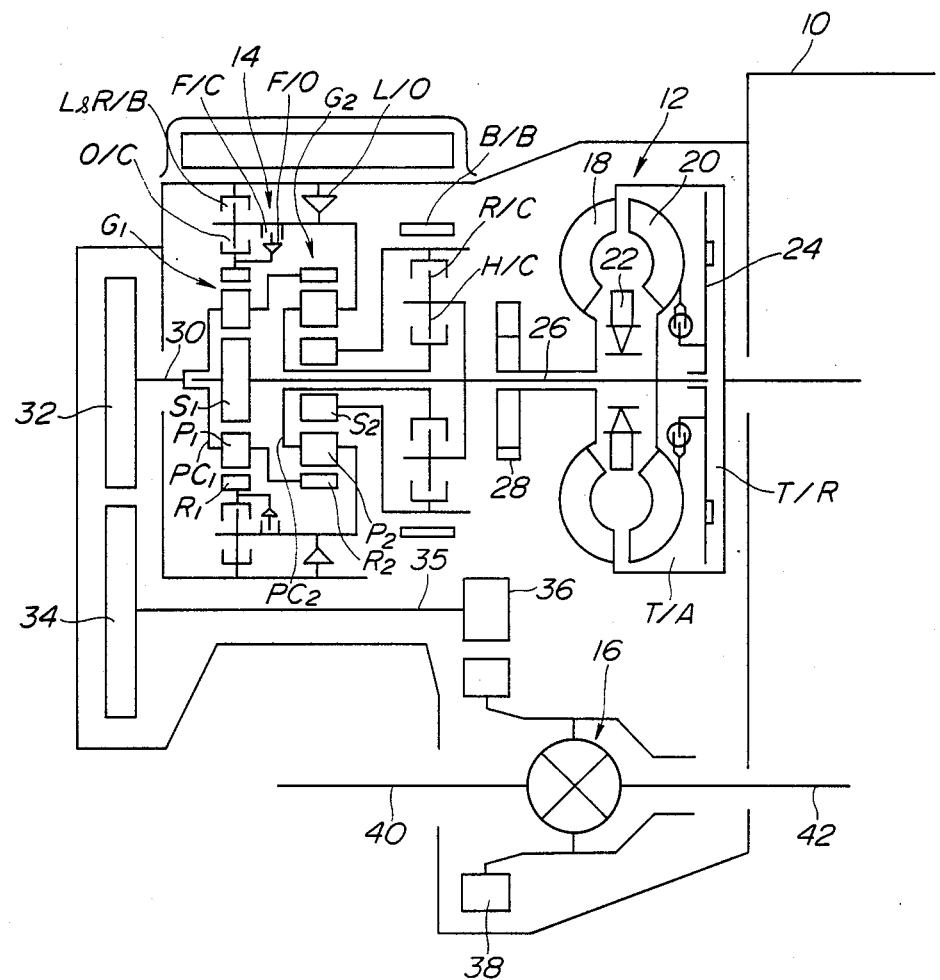
FIG. 2 is a schematic elevation showing a transaxle of the type to which the present invention can be applied.
Figure 3:
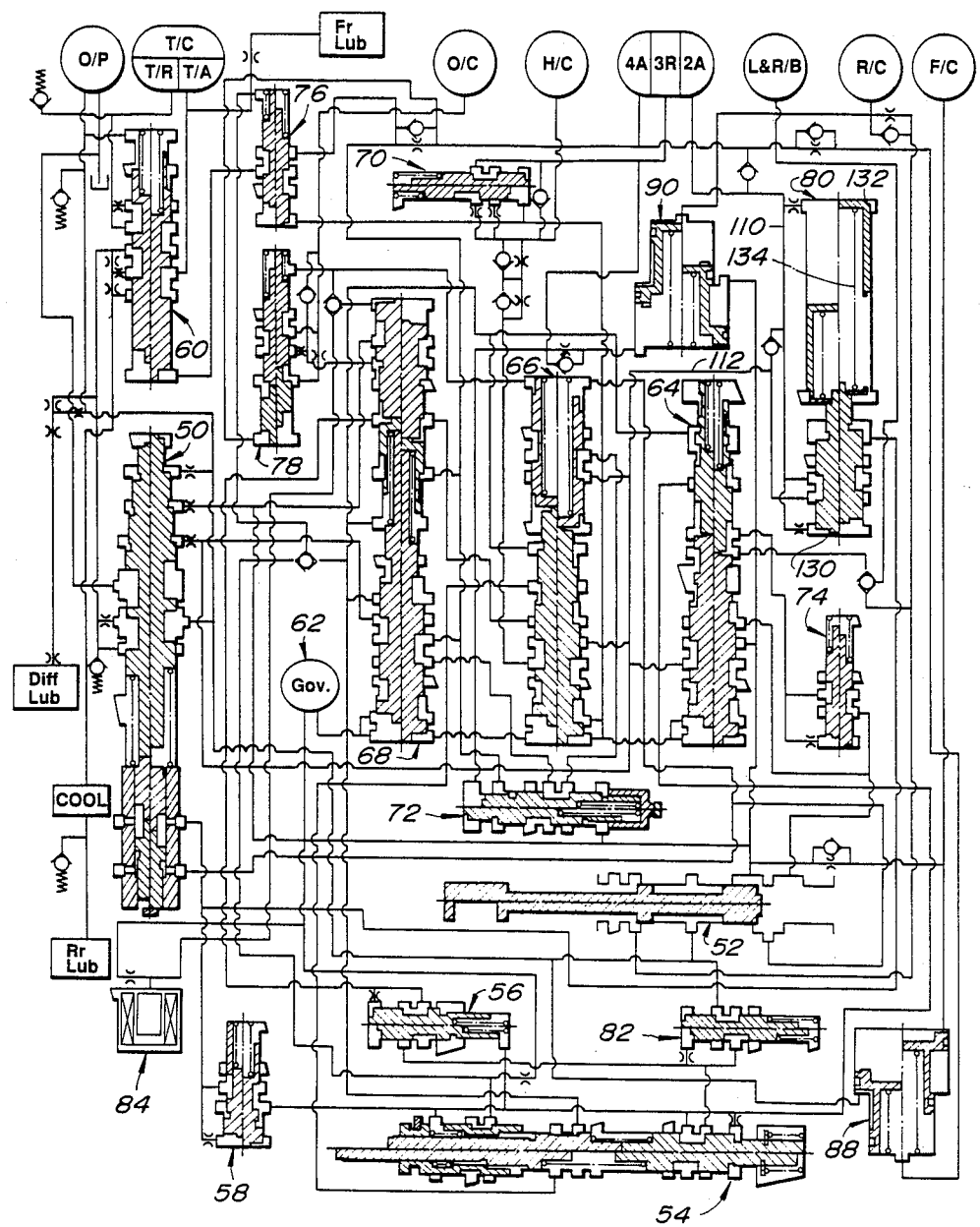
FIG. 3 is a circuit diagram showing a control circuit incorporating the embodiment of the present invention.

FIG. 2 shows in schematic elevational form, an automatic transaxle which includes a torque converter 12, a planetary gear train and a differential or final drive unit 16. This unit is arranged traversely across the vehicle chassis and is connected to an engine 10 at one end thereof. The torque converter (T/C) in this instance includes a pump impeller 18, turbine runner 20, stator 22 and a lock-up clutch 24. With this arrangement when the lock-up clutch 24 is disengaged torque from the engine crankshaft (no numeral) is supplied by way of the pump impeller 18 to a transmission input shaft 26. However, upon engagement of the lock-up clutch 24 the torque is supplied directly to the input shaft 26.

In this transaxle the lock-up clutch 24 is arranged to be responsive to the pressure differential which exists between an apply chamber A/T and a release chamber T/R. It should be noted that an oil pump 28 which outputs pressurized hydraulic fluid is arranged to be driven by the T/C.

The planetary gear train includes first and second gear units G1, G2. The first unit G1 includes a sun gear S1, an internal or ring gear R1 and pinion gears P1 which mesh with the ring and sun gears. The pinion gears are of course are rotatably disposed on a pinion carrier PC1. The second unit G2 similarly includes a sun gear S2, a ring gear R2, pinion gears P2 and a carrier PC2.

The sun gear S1 of the first unit G1 is connected to the input shaft 26 in a manner to undergo synchronous rotation therewith while pinion carrier PC1 and the ring gear R2 of the second unit G2 are connected with a transmission output shaft 30. The ring gear R1 of the first unit G1 is selectively connectable with carrier PC2 by way of the forward one-way clutch F/O and the overrunning clutch O/C. Sun gear S2 is selectively connectable with the input shaft 26 by way of the reverse clutch R/C while the pinion carrier PC2 is arranged to be connectable with the same via a high clutch H/C.

Sun gear S2 can be selectively rendered stationary via the application of a band brake B/B while the pinion carrier PC2 is operatively connected with the parallely arranged low one-way clutch L/O and low and reverse brake L&R/B in a manner which enables the same to be selective held stationary.

An output gear 32 is fixed to one end of the output shaft 30 and arranged to mesh with an idler gear 34. The latter mentioned gear is fixed to one end of a idler shaft 35 which extends parallel to the input shaft 26 and passes back through the transmission as shown. A reduction gear 36 is provided at the inboard end of the idler shaft 35. This gear meshes with a ring gear 38 of the differential unit 16.

Torque is delivered to the wheels of the vehicle by way of stub shafts 40 and 42. In this instance the shafts 40 and 42 are respectively connected with the forward and left and right hand wheels of the vehicle.

With the above described arrangement selective engagement and/or use of the clutches F/C, H/C, O/C, R/C, the brakes B/B and L&R/B and the one-way clutches F/O and L/O it is possible to condition the first and second planetary gear units G1 and G2 to produce four forward and one reverse gear ratios in the manner as depicted in the table shown in FIG. 4.

It should be noted that in this table the circles denote the engagement of an element and or the use of a one-way clutch. In this transmission the engagement of the band brake B/B is controlled by a servo having first, second and third chambers. That is, a second speed apply chamber 2A, a third speed release chamber 3R and a fourth speed apply chamber 4A. In connection with these chambers the circular indicia in the table indicate the chamber being applied with hydraulic pressure. Further, in this table alpha 1 and alpha 2 indicate the ratios of the teeth on the ring gears R1 and R2 and the corresponding sun gears S1 and S2, respectively. The gear ratio defined in the table denote the ratios defined between the rotational speeds of the output and input shafts 30, 26.

With the above described transmission arrangement rotational power or torque is transferred via the gear train from the input shaft 26 to the output shaft 30 and to the final drive or differential unit 16 by way of the output gear 30, the idler gear 34, reduction gear 36 and the ring gear 30. In fourth speed an overdrive condition is established.

Figure 1:
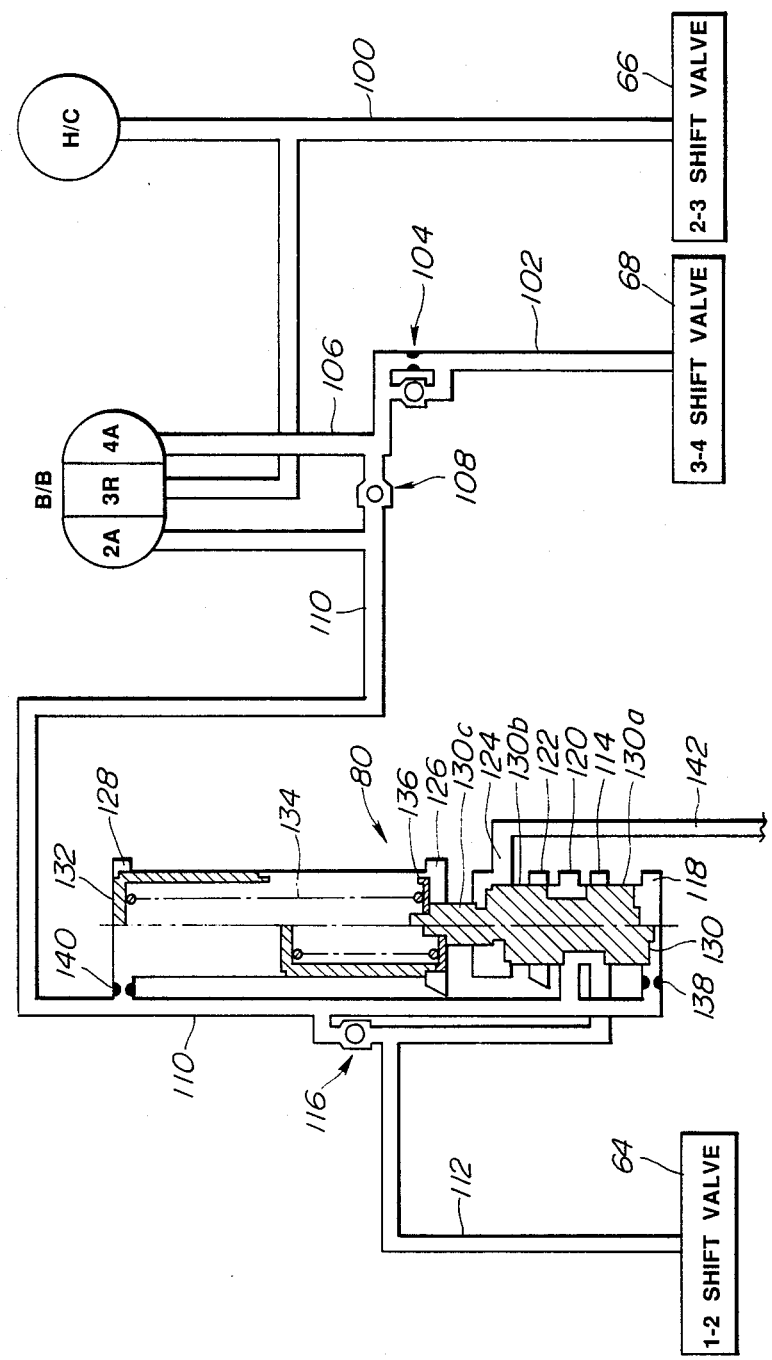
FIG. 1 shows in schematic form, a valve arrangement which characterizes an embodiment of the present invention.

In order to control the above described gear train the hydraulic spool valve system of the nature shown in FIG. 1 is used.

This system includes a pressure regulator valve 50, a manual valve 52, a throttle valve 54, a throttle modifier valve 58, a lock-up control valve 60, a governor valve 62, a 1-2 shift valve 64, a 2-3 shift valve 66, a 3-4 shift valve 68, a 3-2 timing valve 70, a 4-2 sequence valve 62, a fixed first speed pressure reducing valve 74, a speed cut-back valve 76, an overrunning clutch control valve 78, a 1-2 accumulator valve 80, a kickdown modifier valve 83, an N-D accumulator 88 and a servo release accumulator 90.

With the above described arrangement, when the 2-3 shift valve 68 assumes its downshift position wherein the transmission is conditioned to produce third speed, hydraulic fluid is supplied through conduit 100 to the third speed release chamber of the band brake servo and to the high clutch H/C. On the other hand, when the 3-4 shift valve 68 switches to its upshift position wherein the transmission is conditioned to produce fourth speed, hydraulic fluid is supplied by way of conduits 102 and one-way orifice 104 into conduit 106 and into conduit 110 via one-way valve 108. It will be noted that the latter mentioned valve 108 is arranged so that the flow of hydraulic fluid from conduit 110 toward conduits 106 and 102 is prevented. Accordingly, once the second speed apply chamber 2A of the band brake servo is pressurized, drainage through conduit 102 does not occur when the 3-4 shift valve 68 downshifts back to its third speed position.

The 1-2 shift valve 64 is arranged to supply hydraulic fluid into conduit 112 when upon assuming its upshift position. This conduit communicates with port 114 of the 1-2 accumulator valve 80. A one-way valve 116 is disposed between conduits 112 and 110. As shown, this valve is arranged to prevent hydraulic fluid from flowing into conduit 110 while permitting the reverse.

The 1-2 accumulator valve 80 includes seven ports 118, 114, 120, 122, 124, 126 and 128, a spool 130 and accumulator piston 132. A compression spring 134 is disposed between the spool 130 and the accumulator piston 132. The lower end of this spring 134 is arranged to seat on a spring retainer 136 which is disposed on the upper end of the spool 130 and thus apply a bias which tends to move the spool downwardly as seen in the drawings. The spool 130 includes three lands 130a, 130b and 130c. As shown, lands 130a and 130b have the same diameter while land 130c is smaller in diameter than the others. Ports 118, 120 and 128 are arranged to communicate with conduit 110. Orifices 138 and 140 are disposed in ports 118 and 128. Port 114 communicates with conduit 122. Ports 122 and 126 are drain ports. Port 124 communicates with conduit 142 which is supplied with a pressure which varies with the throttle pressure level.

The operation of the above described arrangement is as follows: when the transmission is conditioned to produce first speed, chambers 2A, 3R and 4A are all drained. Under these conditions when the 1-2 shift valve 64 upshifts to its second speed position, hydraulic fluid is supplied into conduit 112 and to port 114 and pressure regulator valve spool 130 assumes the position indicated by the left hand section. The port 114 acts as a supply port and an amount of hydraulic fluid is permitted to flow to port 120 and to drain port 122 via the relatively restricted communication permitted with the spool 130 in this position. Pressure is transmitted from port 120 to a feed-back chamber defined at bottom of the spool 130 via port 118. The pressure acting in the feedback chamber, the force of the spring 134 and the pressure which is supplied to port 124 (viz., a pressure indicative of the throttle pressure) and which acts on the effective cross-sectional area of the spool lands 130b, 130c, establish an equilibrium which induces pressure regulation or modification. At this time, the accumulator piston 132 assumes the position indicated by the right hand section and wherein the force applied by the spring 134 is minimized. According to the position of the spool 130, the adjusted pressure is supplied by way of conduit 110 to port 128 and is applied to the top of the accumulator piston 132 and the second speed apply chamber 2A of the band brake B/B.

As the accumulator chamber fills with hydraulic fluid and the accumulator piston 132 strokes downwardly, the spring 134 becomes compressed increasing the force applied to the spool 130. The spool 130 is accordingly subject to a force which tend to move the same downwardly (as seen in the drawings) and in manner wherein the level of the adjusted pressure tends to be increased. When the pressure which is supplied via conduit 142 increases due to an increased torque demand being placed on the transmission, the level of the regulated pressure varies with the change in the pressure prevailing at port 124. Viz., as the throttle pressure increases the pressure prevailing in conduit 110 increases. Accordingly, the pressure which is supplied to the apply chamber 2A of the band brake servo is increased over a given period of time due to further downward displacement of the spool 130, resulting in the appropriate engagement of this friction element.

It will be noted that as port 126 acts a drain, the stroking of the accumulator piston 134 does not induce any displacement of hydraulic fluid which can adversely effect the pressure prevailing in the throttle pressure circuit. Viz., the pressure which is supplied via port 124 and which acts on the lands 130b and 130c acts simply as a pilot pressure and is therefore unaffected by the level of the regulated pressure and the stroking of the piston 134. Therefore, the level of the throttle pressure which is supplied to the shift values of the system is totally independent of the changes in regulated pressure level and does not undergo any undesirable fluctuations.

What is claimed is:
1. In a transmission
a friction element;
a source of hydraulic fluid;
a source of pressure indicative of the torque being applied to said transmission;
a pressure regulating valve fluidly interposed between said source and said friction element, said pressure regulating valve comprising:
a bore;
a spool reciprocatively disposed in said bore, said spool including;
first and second lands which define a chamber in said bore which chamber is fluidly communicated with said torque indicative pressure source, said first and second lands defining a pressure responsive area which, when acted upon by fluid pressure, produces a bias which tends to move the spool in a first axial direction, and
means defining a feedback chamber in said bore, said feedback chamber being communicated with said friction element in a manner wherein the pressure prevailing therein produces a bias which tends to move said spool in a second axial direction;
an accumulator piston, said accumulator piston being reciprocately disposed in said bore in a manner to define an accumulator chamber which fluidly communicates with said friction element, the pressure prevailing in said accumulator chamber producing a bias which tends to move said accumulator piston in said first axial direction; and a compression spring disposed between said accumulator piston and said spool, said spring being arranged so that the force produced thereby increases as said accumulator chamber fills with hydraulic fluid and displaces said accumulator piston against the bias of said spring.

2. A pressure regulating valve as claimed in claim 1 wherein said first and second lands have different diameters, said first land having a smaller diameter than the second land, said first land being located between said second land and said accumulator piston.

3. A pressure regulating valve as claimed in claim 1 wherein said source of hydraulic fluid comprises a shift valve, said shift valve having an upshift position and a downshift position, said shift valve being arranged to discharge hydraulic fluid into a first conduit leading to said pressure regulating valve upon assuming said upshift position.

4. A pressure regulating valve as claimed in claim 3 further comprising a second conduit, said second conduit leading from said pressure regulating valve to said friction element, said first and second conduits being fluidly communicated with a one-way valve which permits hydraulic fluid to flow only from said second conduit into said first conduit.

5. A pressure regulating valve as claimed in claim 1 wherein the diameter of said accumulator piston is greater than said second land.

6. A pressure regulating valve as claimed in claim 1 wherein said feedback defining means comprises a third land on said spool, said third land having essentially the same diameter as said second land.

7. A pressure regulating valve as claimed in claim 1 further comprising first and second orifices, said first orifice being arranged to restrict the rate at which hydraulic fluid can flow into and out of said accumulator chamber, and said second orifice being arranged to restrict the rate at which hydraulic fluid can flow into and out of said feedback chamber.

8. A pressure regulating valve for a transmission having a shift valve and a friction element arranged to be supplied with hydraulic fluid from said shift valve, said pressure regulating valve comprising:

a bore;

a spool;

an accumulator piston;

a spring disposed between said spool and said piston, said spring being arranged to bias the spool in a first axial direction which tends to maximize the amount of hydraulic fluid which is supplied to a friction element;

said accumulator piston defining an accumulator chamber, said chamber being arranged so that as it fills the spring is compressed increasing the force applied thereby, said spool defining a first feedback chamber in said bore, said first chamber being arranged so that as the pressure therein biases the spool in a second direction which minimizes the supply of hydraulic fluid to the friction element, and means defining a second chamber which is supplied directly with a pressure indicative of transmission torque, said second chamber being arranged so that the pressure therein produces a bias which acts on the spool in the first axial direction and which produces no resistance to the stroking of the accumulator piston.

* * * * *